Figure 1:
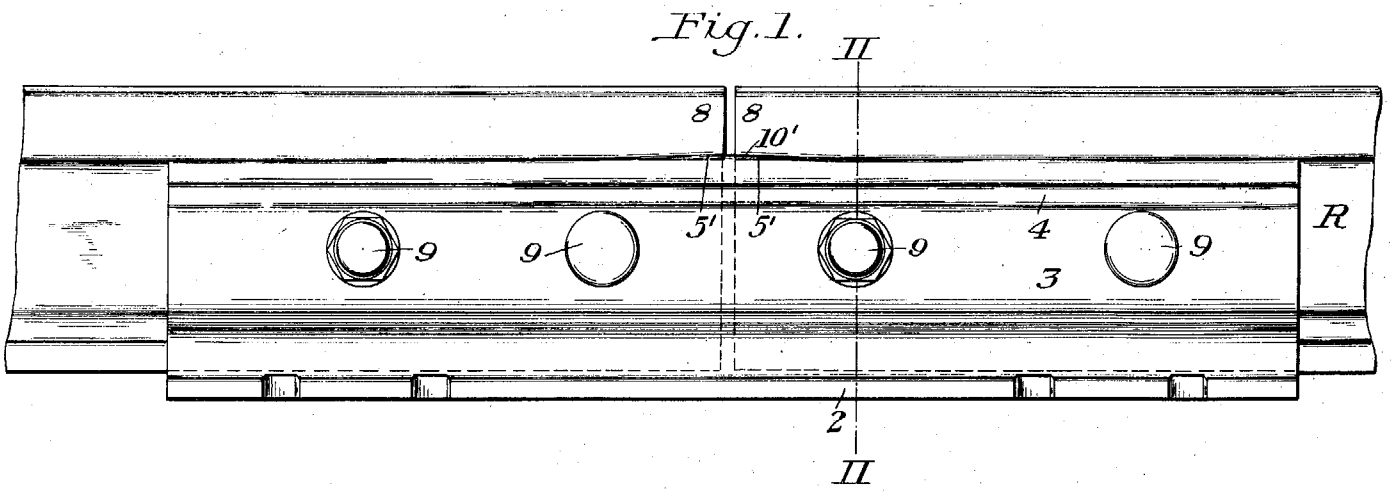

April 11, 1933. E. WOODINGS Re. 18,794

SPLICE BAR

Original Filed Jan. 10, 1925

INVENTOR

Emanuel Woodings, by Symes, Lawrence & Parmelee, his attys.

Reissued Apr. 11, 1933

Re. 18,794

UNITED STATES PATENT OFFICE

EMANUEL WOODINGS, OF OAKMONT, PENNSYLVANIA, ASSIGNOR TO WOODINGS-VERONA TOOL WORKS, OF VERONA, PENNSYLVANIA, A CORPORATION OF PENNSYLVANIA

SPLICE BAR

Original No. 1,547,854, dated July 28, 1925, Serial No. 1,552, filed January 10, 1925. Application for reissue filed February 16, 1933. Serial No. 657,070.

The present invention relates broadly to metal working, and more particularly to the problem either of making splice bars of the character adapted to be utilized with railway rails, or of reclaiming splice bars of this type after they have served a predetermined period of usefulness.

At the present time it is customary in the art to which the present invention relates to apply splice bars in pairs to the joints between rail ends to tie the rails together, the bars being applied on opposite sides of the rail joints and bolted to the rail ends. Due to the pounding action of the rails on the splice bars under the action of the rolling stock, the upper faces of the splice bars which engage under the rail heads are gradually hammered down or worn away. To compensate for this, the bolts are taken up at intervals to draw the splice bars inwardly. This operation is repeated from time to time until all of the play is taken up and the splice bars engage the webs of the rails. When this occurs, further adjustment to compensate for wear is not possible, and the period of usefulness of the splice bars being over, it is necessary to replace the same.

Heretofore such worn splice bars have customarily either been discarded, or they have been planed down in a milling machine or the like to a smaller size adapting them for use with smaller rails. These smaller rails, however, are only found on sidings and the like where splice bars are not subjected to such heavy usage, and consequently there has not been an outlet for all of the splice bars rendered unfit for usage on the main lines. This has represented a considerable loss each year, not only in the scrapping of the bars, but in the handling thereof.

I have also found by careful observation that new splice bars, irrespective of the method in accordance with which they are manufactured, are not adapted to most effectively cooperate with old rails. This is true for the reason that the hammering action which destroys the splice bars also effects a hammering down and wearing away of the rail ends, thereby leaving spaces between the under side of the rail heads and the tops of the splice bars. In order to obviate this, it has heretofore been considered advantageous to crop the ends of the rails, to thereby eliminate the worn portions. The cropping, however, has been a laborious and expensive operation, and has necessitated a partial relaying of the rails to bring the ends into the desired relationship.

In accordance with the present invention there is provided a splice bar adapted to cooperate either with new or worn rails, and so constructed that not only is the necessity for cropping obviated, but that a greater length of life of the rails and splice bars is insured.

It is a further object of the present invention to provide a splice bar either as a new article of manufacture, or as a reclaimed article, of such construction that highly efficient rail engaging surfaces are provided.

Figure 2:
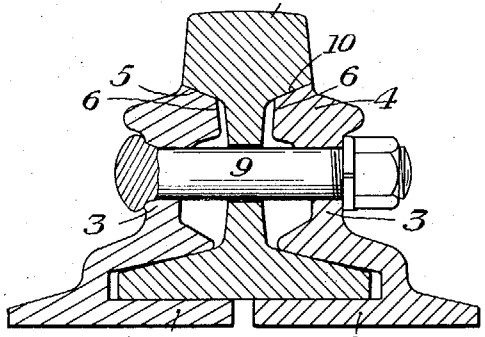

In the drawing, Fig. 1 is a side elevation illustrating my improved splice bar in position at a rail joint; Fig. 2 is a transverse sectional view on the line II—II of Fig. 1, showing the relative positions of a rail and splice bars when the splice bars are first applied; and Fig. 3 is a view similar to Fig. 2, but showing the relative positions of the rail and splice bars after the latter have been worn to such an extent that they engage the web of the rail.

In illustrating the present invention, I have shown a splice bar of the so-called continuous type, it being understood, however, that the invention is not limited to splice bars of any particular construction, the present drawing being for purpose of illustration only. This type of splice bar is furthermore shown for the reason that there are at the present time hundreds of thousands of pairs of such bars which are now considered as scrap, for the reason that they have completed their period of usefulness. The improved splice bar whether as originally constructed or as renewed after a period of use comprises a slotted base 2 adapted to embrace one edge portion of the base flange of a rail, a web 3, and a head 4, the upper edge faces 5 of the head being adapted to engage beneath the head of a rail R.

In Figure 2 there is illustrated in transverse section a pair of the improved splice bars in position on a rail, the inner side faces 6 of the splice bars being spaced from the web of the rail. Under the action of the rolling stock, however, the upper faces 5 of the splice bars and the underside of the heads of the rails are worn away, thereby providing room for play between the splice bars and the rail heads. To overcome this play, and compensate for the decrease in the effective height of the splice bars, the bolts 9 are tightened from time to time to draw the splice bars inwardly, thereby causing the inclined upper faces 5 to again come into snug engagement with the under side 10 of the rail heads, thereby maintaining the upper surfaces of the rails flush at the joint and in line with the main rail body at all times.

Figure 3:
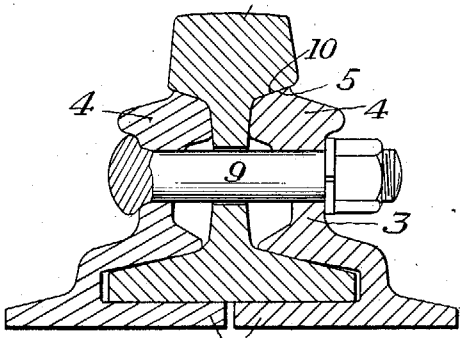

When the faces 5 and 10 have become worn away or hammered down to such an extent that the tightening of the bolts 9 causes the splice bar heads to bear against the webs of the rails, as indicated in Figure 3, further adjustment of the splice bars to compensate for wear is not possible. The splice bars have then about reached the end of their service and must be replaced by new ones.

The wearing of the splice bars is accompanied by the wearing of the under-surfaces 10 of the ends of the rail heads, so that these rails have slightly recessed portions 10′ adjacent to their ends, as shown in Fig. 1. Thereafter, if new splice bars as at present constructed, are applied the recessed portions of the rail heads will not bear on the upper edges of the splice bars and therefore the rail heads will tend to hammer down adjacent to joints, thereby providing a dangerous and objectionable track condition, and hence it is the present practice to cut off the defective ends of the rails. In accordance with the present invention, the splice bars except for the central portion, are made of such a height that the upper and lower edges of the bars will bear respectively against the underside of the heads and the upper surfaces of the flanges of the rails. In other words, the end portions do not differ substantially in height from the present practice. The central portions of the bars are made of a greater height by an amount approximately equal to the tolerated depth of recessing due to the pounding of the wheels, i. e., about one-sixteenth at the center of the bar but tapering towards the ends of the bar, in other words, reshaping the medial portion only of the bar to produce an upwardly projecting crown local to the central portion of the bar. While the greater height of the central portions will prevent such portions from passing under the heads of the rails when the latter and the splice bars are new, as in the present practice the inclinations of the undersides of the rails and the upper surfaces of the bars will permit the bars passing under the rail heads sufficiently far to afford efficient support. It has been found, however, that there is sufficient resilience in the bars longitudinally to permit the end portions being forced in towards the rails a greater distance than the middle portions when the nuts are screwed onto the bolts. By reason of the stress under which the central portions are placed, they will be pressed in as wear occurs. When the splice bar having this increased height at the center is utilized with worn rails, there is an immediate compensation for the wear which has taken place in the rails, thereby making it possible to hold the tread of the rails in alignment at the joints.

It will be understood that by the employment of suitably designed dies, splice bars as at present constructed, i. e. of uniform height for their entire lengths may be reshaped to embody the novel features shown and described herein. By actual tests the reclaimed or reformed bars have been found to be better than the original product by reason of the improved quality of the material in the head due to the additional working in the dies as well as the trueing of a rail engaging surface. In new bars as well as in the reclaimed bars the provision of the greater height at the center of the bars gives both a longer period of usefulness by reason of greater adjustability and enables the bars to be used with either new or worn rails.

I claim:

1. A reclaimed splice bar for railway rails having straight end portions with parallel top and bottom rail engaging surfaces which respectively have a flat engagement with the undersides of the rail heads and with the upper sides of the rail flanges, and having only its medial portion above the bolt holes reshaped to form a crown local to the central portion of the bar and projecting above the contiguous straight top surfaces thereof, the said bar also having its bottom surface straight and flat throughout for flatly engaging the upper surfaces of adjacent rail flanges.

2. A reclaimed splice bar for use with worn rails having its medial portion only above the bolt holes reshaped into a crown projecting above the adjacent top surfaces of the bar body and sloping both ways from the middle of the bar, said upwardly projecting crown being adapted to fit the worn places in the rail ends at the undersides of the heads thereof, and the base on the bar being straight and flat throughout and adapted to evenly seat on the upper surfaces of the rail flanges from end to end of the bar.

3. A reclaimed splice bar for use with worn rails having its medial portion only reshaped into a crown projecting above the adjacent top surfaces of the bar body and sloping both ways from the middle of the bar, said upwardly projecting crown being adapted to fit the worn places in the rail ends at the undersides of the heads thereof; and the base on the bar adapted to seat on the upper surfaces of the rail flanges from end to end of the bar.

EMANUEL WOODINGS.